US008053135B2

(12) United States Patent
Chang et al.

(10) Patent No.: US 8,053,135 B2
(45) Date of Patent: Nov. 8, 2011

(54) MICROPOROUS THIN FILM COMPRISING NANOPARTICLES, METHOD OF FORMING THE SAME, AND FUEL CELL COMPRISING THE SAME

(75) Inventors: Hyuk Chang, Seongnam-si (KR); Ji-rae Kim, Seoul (KR)

(73) Assignee: Samsung SDI Co., Ltd., Suwon (KR)

( * ) Notice: Subject to any disclaimer, the term of this patent is extended or adjusted under 35 U.S.C. 154(b) by 1057 days.

(21) Appl. No.: 10/813,392

(22) Filed: Mar. 31, 2004

(65) Prior Publication Data

US 2011/0244371 A1 Oct. 6, 2011

(30) Foreign Application Priority Data

Jul. 2, 2003 (KR) .................. 10-2003-0044540

(51) Int. Cl.
*H01M 4/38* (2006.01)

(52) U.S. Cl. ........ 429/485; 429/474; 429/480; 429/481; 429/484; 429/487; 429/522; 429/524; 429/525; 429/526; 429/527; 429/534; 429/535

(58) Field of Classification Search .................. 429/162, 429/474, 480, 481–485, 487, 522, 524–528, 429/534, 535

See application file for complete search history.

(56) References Cited

U.S. PATENT DOCUMENTS

| | | | |
|---|---|---|---|
| 5,077,258 A | 12/1991 | Phillips et al. | |
| 5,750,013 A | 5/1998 | Lin | |
| 6,136,704 A | 10/2000 | Maya | |
| 2001/0041277 A1* | 11/2001 | Chang | 429/30 |
| 2003/0130114 A1* | 7/2003 | Hampden-Smith et al. | 502/180 |
| 2003/0175579 A1* | 9/2003 | Uchida et al. | 429/42 |

FOREIGN PATENT DOCUMENTS

| | | |
|---|---|---|
| JP | 09-265993 | 10/1997 |
| JP | 2000-182628 | 6/2000 |
| JP | 2001-240755 | 9/2001 |
| JP | 2001-307751 | 11/2001 |
| JP | 2002-110197 | 4/2002 |
| WO | 02/15303 | 2/2000 |

OTHER PUBLICATIONS

Zhao, Y. et al., "Preparation and Structure Analysis of Nanocrystalline Ti Film", Atomic Energy Science and Technology, vol. 38, No. 4/5, Jul. 2002.
Certificate of Patent from Chinese Intellectual Property Office dated Mar. 28, 2007 in Chinese Patent Application No. ZL200410002823.4.

* cited by examiner

*Primary Examiner* — Patrick Ryan
*Assistant Examiner* — Ben Lewis
(74) *Attorney, Agent, or Firm* — H.C. Park & Associates, PLC (57) ABSTRACT

A microporous thin film, a method of forming the same and a fuel cell including the microporous thin film, are provided. The microporous thin film includes uniform nanoparticles and has a porosity of at least about 20%. Therefore, the microporous thin film can be efficiently used in various applications such as fuel cells, primary and secondary batteries, adsorbents, and hydrogen storage alloys. The microporous thin film is formed on a substrate, includes metal nanoparticles, and has a microporous structure with porosity of 20% or more.

15 Claims, 9 Drawing Sheets

MICROPOROUS THIN FILM COMPRISING NANOPARTICLES, METHOD OF FORMING THE SAME, AND FUEL CELL COMPRISING THE SAME

BACKGROUND OF THE INVENTION

This application claims priority from Korean Patent Application No. 2003-44540, filed on Jul. 2, 2003, in the Korean Intellectual Property Office, the disclosure of which is incorporated herein by reference in its entirety.

FIELD OF THE INVENTION

The present invention relates to a microporous thin film comprising nanoparticles, a method of forming the same, and a fuel cell comprising the same. More particularly, the present invention relates to a microporous thin film with uniform nanoparticles and high porosity. The microporous thin film can be efficiently used in various applications such as fuel cells, primary and secondary batteries, adsorbents, and hydrogen storage alloys.

DESCRIPTION OF THE RELATED ART

A thin film with improved physical properties due to the thin film having a compact structure is widely used in semiconductor devices or the like. Various deposition technologies are used for the formation of such a thin film. However, the compact structure of the thin film decreases the surface area for the thin film, and thus, cannot be used in applications requiring chemical reaction efficiency. In order to solve this problem, a thin film formation technology has developed in which a tape or spray casting process is carried out after dispersing a desired material in a solvent. A thin film formed in this way has pores, thereby increasing the reaction efficiency of the film. However, formed powders on the film agglomerate and grow into micron-sized particles. Therefore, good properties obtained from nano-sized particles cannot be maximally accomplished. Also, the above process facilitates the formation of a thick film with low utility, rather than the formation of a thin film with high utility.

Meanwhile, the storage technology of previously produced hydrogen has various technical issues that must be solved for entry into the hydrogen energy era. Generally, a hydrogen storage alloy is capable of reversibly absorbing and releasing a large amount of hydrogen at 300° C. or less. Absorbed hydrogen is transformed into a hydride. In order to carry out this reaction, hydrogen enters into octahedral or tetrahedral sites in an alloy crystal lattice by diffusion. Alloys with this property are combinations of Group 1 or 2 metals that form metal hydride, with Group 13 or 14 metals that facilitate the absorbing and releasing of hydrogen. These alloys have an intrinsic hydrogen absorption amount and an intrinsic hydrogen absorption pressure according to their alloy composition. In this case, a basic reaction mechanism for hydride formation is as follows: a hydrogen gas is adsorbed on an alloy surface and then moves into an alloy crystal lattice by diffusion to thereby produce a hydride. This reaction mechanism is common to all hydrogen storage alloys.

Conventionally, a hydrogen storage alloy with a desired composition is prepared by melting alloy metals in a vacuum arc furnace or a vacuum high frequency-induced furnace. In this case, characteristics of a hydrogen storage alloy can be improved by changing the alloy composition or surface-plating for oxidation prevention. However, technologies facilitating the hydride formation are not known. Conventionally, heat treating the alloy assures a uniform alloy composition and pulverizing the alloy by milling and hydriding-dehydriding reduces the powder size of an alloy to a range of 100 to 200 µm. A hydrogen storage alloy prepared in this way typically has a particle size of 10 to 100 µm. In the case of applying such an alloy preparation technology to a nickel-hydride secondary battery, there is a problem in that it cannot be used in the application fields requiring high-speed charging and discharging such as, batteries for electric vehicles. Further, when a large amount of hydrogen comes in and out an alloy crystal lattice by repeated charging and discharging, the structure of the alloy crystal lattice changes, thereby facilitating the deterioration of the electrodes. In addition, in the case of applying such an alloy preparation technology to a heat pump, the circulation speed of cooling and heating becomes slow. Therefore, a tank capable of storing a large amount of hydrogen is required to continue cooling and heating.

Meanwhile, primary or secondary batteries are devices that convert chemical energy into an electrical energy by means of an electrochemical reaction. Primary batteries are only dischargeable. On the other hand, secondary batteries are chargeable and dischargeable several times. Due to these characteristics, secondary batteries are used as sources of electric power for mobile equipment and have been actively studied as essential technologies that lead to the multimedia era together with semiconductors.

Figure 3:
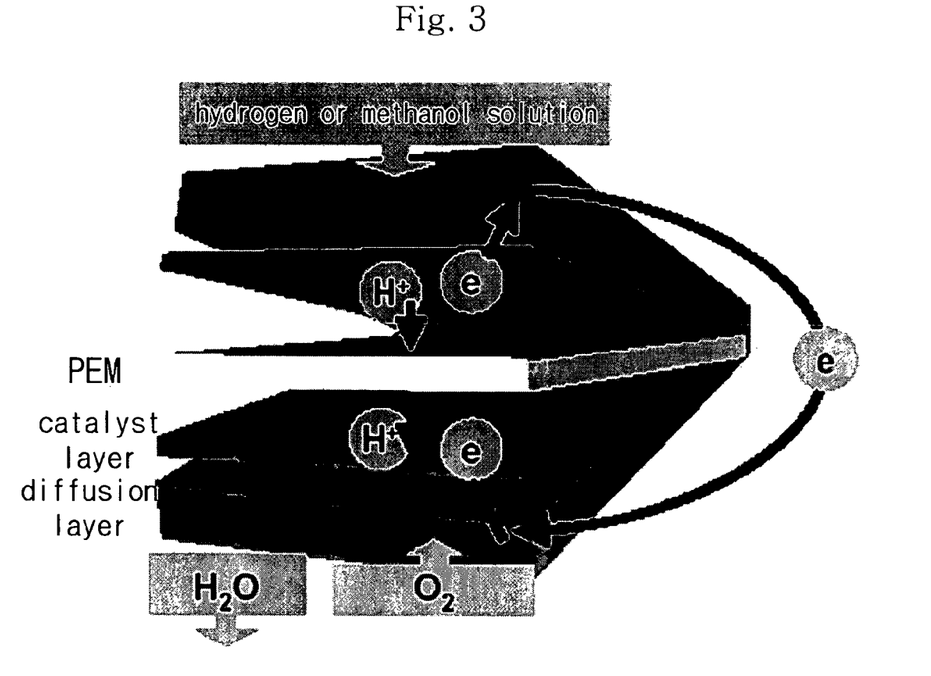
FIG. 3 is a diagram of an electrode structure, a fuel transfer, and a reaction pathway in a fuel cell comprising a catalyst layer, a diffusion layer, and an electrolyte.

Fuel cells are pure energy sources capable of reducing dependence on fossil energy, having a high output density and high energy conversion efficiency. Electrodes with a high output density and fuel cells with high energy conversion efficiency can be accomplished by optimizing the utility of electrochemical catalysts used in the electrodes. FIG. 3 shows an electrode structure, fuel transfer, and reaction pathway in conventional fuel cells.

Various types of electrolytes can be used in fuel cells. Fuel cells can operate at room temperature and can be miniaturized and packed. Therefore, fuel cells can be widely used in the fields of zero emission vehicles, domestic power systems, mobile communication equipment, medical instruments, military equipment, equipment for aerospace industry, and the like. In particular, in direct methanol fuel cells (DMFCs) using an aqueous methanol solution as a fuel source, the aqueous methanol solution instead of hydrogen is supplied to an anode and then is oxidized in the presence of a catalyst to generate hydrogen ions, electrons, and carbon dioxide. For this reason, the DMFCs have lower reaction efficiency than fuel cells using a gas.

In the above-described fuel cells, a catalyst layer comprises catalytic metal particles and is coated on a substrate having specific properties. The catalyst layer is used in electrochemical oxidation/reduction of reactive gaseous fuels, i.e., hydrogen, methanol, and oxygen. Conventionally, the catalyst layer is prepared by making into a slurry a catalytic metal prepared by a chemical reduction and then coating the slurry on a substrate. According to this method, ultra-fine catalytic metal particles with a particle size of 2 to 5 nm are initially obtained. However, these particles on the electrode agglomerate to provide particles with a diameter size of more than several hundreds nanometers due to self-assembly of a large number of catalytic particles, thereby decreasing catalytic efficiency.

SUMMARY OF THE INVENTION

The present invention is directed to a microporous thin film with high chemical reaction efficiency, a method of forming the microporous thin film, and a fuel cell comprising the microporous thin film.

BRIEF DESCRIPTION OF THE DRAWINGS

The above and other features and advantages of the present invention will become more apparent by describing in detail exemplary embodiments thereof with reference to the attached drawings.

DETAILED DESCRIPTION OF THE INVENTION

The present invention, also discloses a microporous thin film formed on a substrate, the thin film comprising metal nanoparticles and the thin film having a microporous structure with porosity of about 20% or more. The porosity of the microporous thin film may be about 20 to about 50%.

According to another aspect of the present invention, there is provided a method of forming on a substrate a microporous thin film which comprises metal nanoparticles and where the thin film has porosity of about 20% or more. The method includes sputtering a metal source on the substrate using argon (Ar) as a first reaction gas and helium (He) or neon (Ne) as a second reaction gas under a total pressure of about 300 to 1,000 mTorr. The sputtering may be a DC magnetron sputtering process at a power of about 200 to about 500 W. A mixture ratio of the first reaction has to the second reaction gas may range from about 1:1 to about 1:0.5.

The metal source for the metal nanoparticles may be platinum; an alloy or mixture of platinum with one or more selected from the group consisting of gold, palladium, rhodium, iridium, ruthenium, tin, and molybdenum; or a combination or alloy of a Group 1 or 2 metal that has a hydrogen absorbing and releasing property with a Group 13 or 14 metal that facilitates the absorbing and releasing of hydrogen.

The metal nanoparticles may have an average particle size of about 1 to about 10 nm. The thin film formed on the substrate may be about 0.01 to about 1 μm thick.

The thin film may be efficiently used in a lithium oxide electrode, a catalytic electrode for a fuel cell, a chemical catalyst, an adsorbent, or a hydrogen storage alloy.

The present invention, discloses a fuel cell comprising a pair of electrodes and an electrolyte film interposed between the electrodes, where each of the electrodes includes a catalyst layer in contact with the electrolyte film and a gas diffusion layer in contact with the catalyst layer. The catalyst layer includes metal nanoparticles and has a microporous structure with porosity of about 20% or more.

Figure 2:
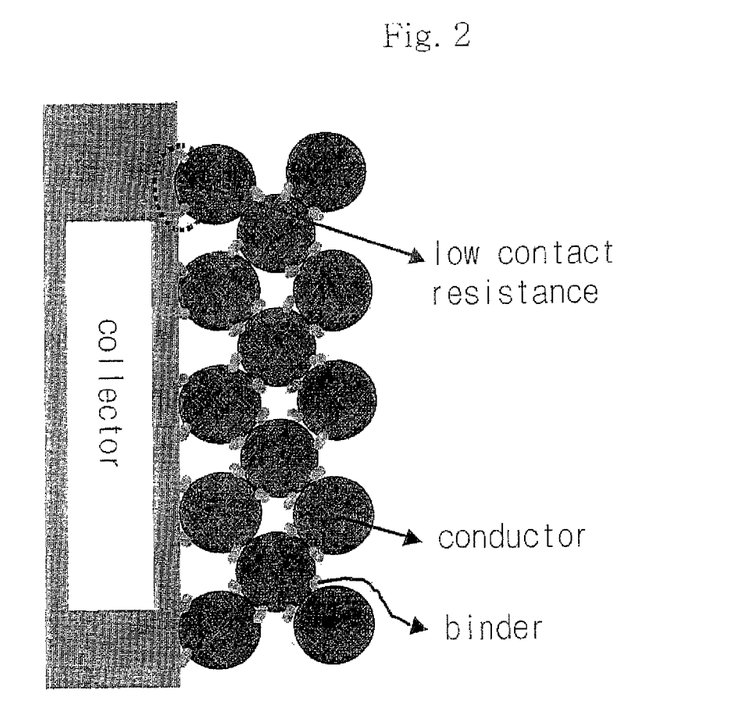
FIG. 2 is a diagram of the structure of a collector coated with active materials for a secondary battery and the intercalation pathway of lithium ions.

In secondary batteries, active materials that promote an electrode reaction are coated on a predetermined substrate, as shown, for example, in FIG. 2. In this case, FIG. 2 shows an embodiment of the invention where nanoparticles with high reactivity are formed into a microporous structure. Therefore, electrochemical efficiency of these batteries is improved. Furthermore, equipment comprising these batteries can have small size, lightweight, high-energy density, and low cost.

Hereinafter, the present invention will be described in more detail.

According to the present invention, metal nanoparticles are formed on a substrate by various deposition methods, preferably by sputtering.

In this case, reaction gases, i.e., Ar as a first reaction gas and He or Ne as a second reaction gas is maintained at a high pressure to obtain sputtered particles. The porosity of the metal nanoparticles coated on the substrate is determined by the motion energy of the sputtered particles. By adjusting the motion energy of the sputtered particles, a microporous thin film having the porosity of about 20% or more, preferably about 20 to about 50% can be is obtained. If the porosity of the thin film is less than 20%, it is difficult to obtain effects intended in the present invention. On the other hand, if it exceeds 50%, the weight of the nanoparticles used per unit area decreases, thereby decreasing total system efficiency.

The substrate that can be used herein may be a carbon paper or a carbon fiber that can be used in a fuel cell; a metal film such as aluminium, copper, and nickel that can be used in a secondary battery or capacitor; and a metal or ceramic that can be used in a hydrogen storage alloy.

Figure 1:
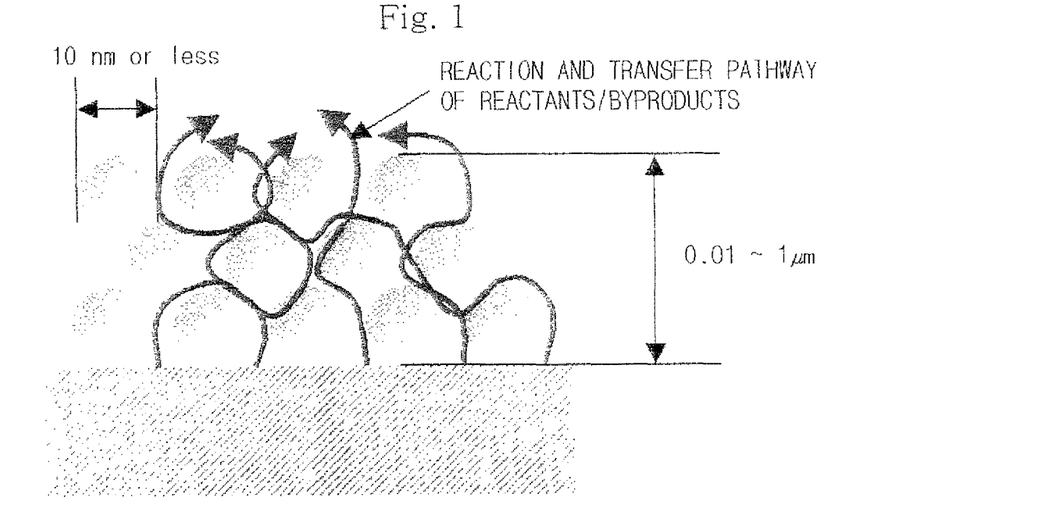
FIG. 1 is a diagram of the section of a microporous thin film and the transfer pathway of reactants/byproducts according to the present invention.
Figure 7A:
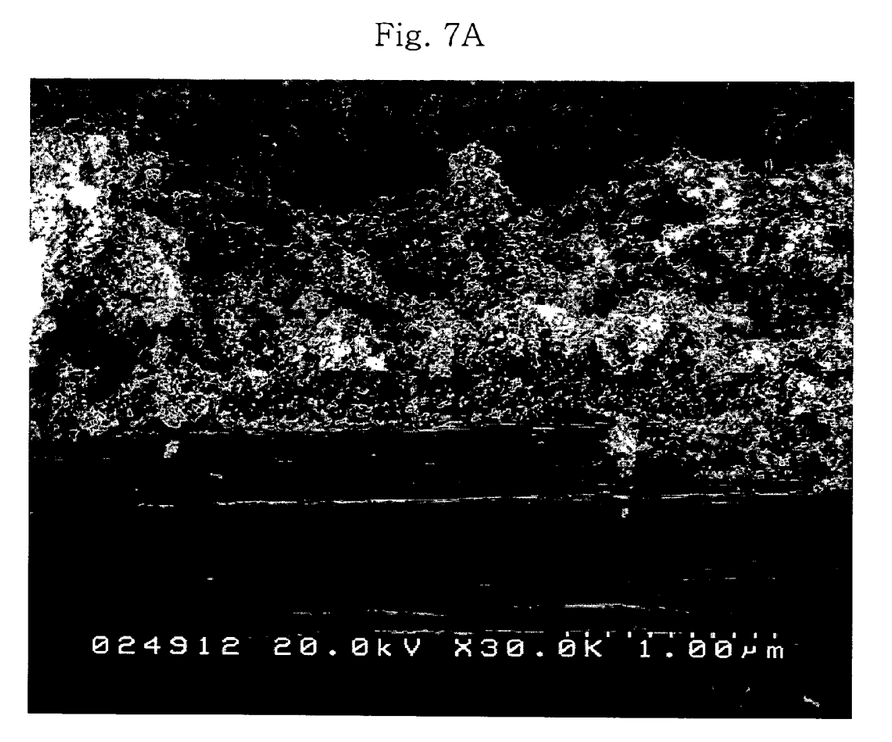
FIGS. 7A and 7B are SEMs of the sections of microporous thin films according to Example 1.
Figure 7B:
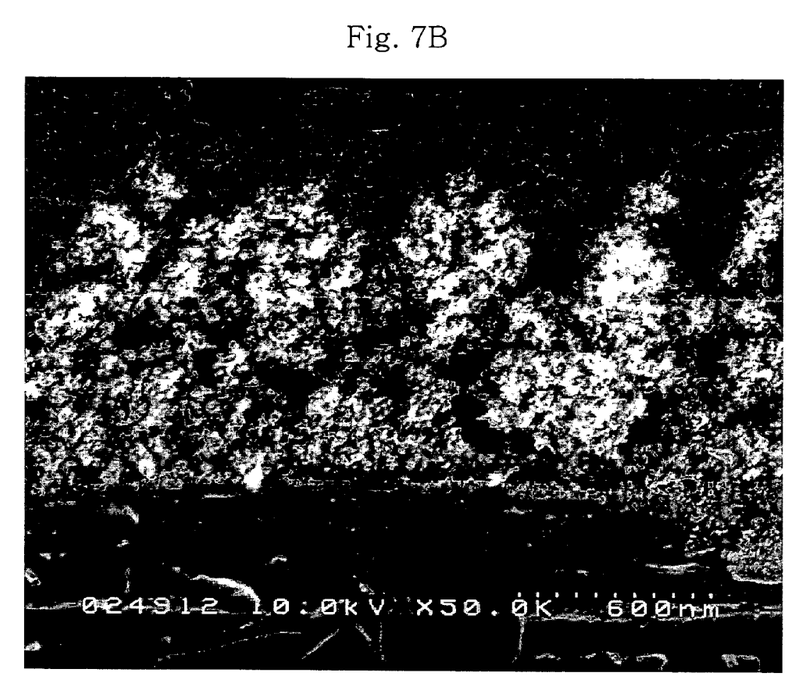
Figure 8:
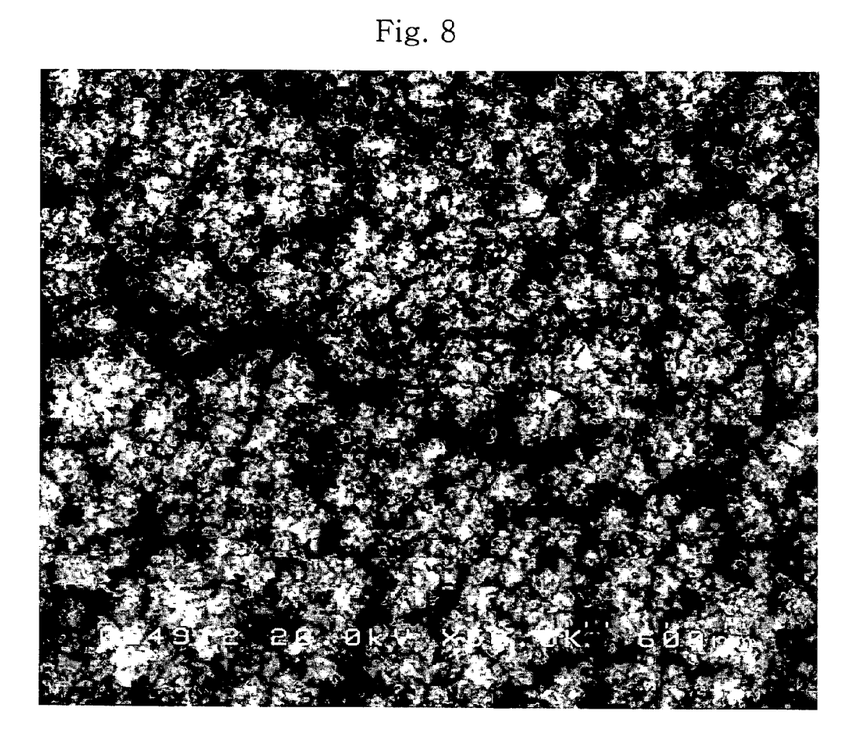
FIG. 8 is a SEM of the surfaces of the microporous thin films according to Example 1.

A microporous thin film obtained according to the above-described deposition method has an ideal structure as shown in FIGS. 1, 7A, 7B, and 8. FIG. 1 is a schematic diagram of the section of a microporous thin film and the transfer pathway of reactants/byproducts according to the present invention. FIGS. 7A and 7B are scanning electron microphotographs (SEMs) showing the section structures of thin films according to the present invention, and FIG. 8 is a 500,000 times enlarged electron transmission microphotographic image of the SEM of the surface of a thin film according to the present invention.

Referring to FIGS. 7A, 7B, and 8, metal nanoparticles are distributed substantially uniformly on a substrate and a large number of pores are observed between the metal nanoparticles. The images as shown in FIGS. 7A, 7B, and 8 are in distinct contrast with the images shown in FIGS. 4 and 5 where a compact thin film is formed, unlike a microporous thin film according to the present invention.

As described above, a thin film of the present invention comprises uniform nanoparticles and has a wide reactive surface area due to its high porosity, thereby increasing the utility of the thin film. Also, the supply of reactants and removal of byproducts can be facilitated. Therefore, a thin film of the present invention can be efficiently used in the fields requiring a fine particle layer for high chemical reaction efficiency, i.e., a lithium oxide electrode, a catalytic electrode for a fuel cell, a chemical catalyst, an absorbent, or a hydrogen storage alloy.

A method of forming a microporous thin film according to the present invention will now be described.

First, a metal source is sputtered to deposit metal nanoparticles on a surface of a substrate. The metal source for the metal nanoparticles may be a platinum; an alloy or mixture of platinum with one or more selected from the group consisting of gold, palladium, rhodium, iridium, ruthenium, tin, and molybdenum; or a combination or alloy of a Group 1 or 2 metal that has a hydrogen absorbing and releasing property with a Group 13 or 14 metal that facilitates the absorbing and releasing of hydrogen.

The substrate that can be used herein may be a carbon paper or a carbon fiber that can be used in a fuel cell; a metal film such as aluminium, copper, and nickel that can be used in a secondary battery or capacitor; and a metal or ceramic that can be used in a hydrogen storage alloy.

In particular, in the case of using the thin film in a catalytic electrode for a fuel cell, platinum (Pt) is used as a metal source in a polymer electrolyte membrane fuel cell (PEMFC) and platinum/ruthenium (Pt/Ru) are used as a metal source in a direct methanol fuel cell (DMFC).

It is preferable to limit the average particle size of the metal nanoparticles to a range of about 1 to about 10 nm to increase the utility of the thin film.

The metal source may be sputtered by all conventional sputtering methods. A DC magnetron sputtering is preferred. According to this method, catalytic metal atoms are separated from a bulk target by motion of an accelerated inert gas and then generate a uniform plasma by a magnetron. The plasma thus generated is deposited on a surface of the substrate. Through this deposition process, metal nanoparticles can be uniformly dispersed on a surface of the substrate.

The sputtering conditions may vary depending on the desired particle size and the degree of dispersion of the metal nanoparticles. However, it is preferable to set a power of a sputtering gun to a range of about 200 to about 500 W to obtain a desired porosity. If the power of the sputtering gun is less than 200 W, the excessive low small power makes it difficult to obtain, a deposition layer with a desired particle size. On the other hand, if it exceeds 500 W, it is difficult to generate a uniform plasma.

An inert gas is used as a reaction gas in a reaction chamber. For this, a mixture gas of Ar as a first gas and He or Ne as a second gas may be used.

In this case, the Ar as the first gas is used for direct sputtering. The He or Ne as the second gas is used to decrease the motion energy of metal particles in the plasma by colliding it with the metal particles. By doing so, the porosity of the thin film is adjusted. Therefore, the metal particles can be deposited in high density, thereby increasing reaction efficiency.

There are no particular limitations on a mixture ratio of the first gas to the second gas. However, it is preferable to set the mixture ratio to a range of about 1:0.5 to about 1:1 to ensure an appropriate porosity. If the ratio of the second gas is less than 0.5, collision of it with the metal particles is insufficient, and thus, it is difficult to obtain a desired porosity. On the other hand, if it exceeds 1, a strong plasma cannot be generated from a target material or a deposition rate may decrease excessively.

The pressure of the reaction gases during sputtering may range from about 300 to about 1,000 mTorr, which is 30 to 50 times higher than in the formation of a conventional thin film. If the pressure is less than 300 mTorr, a metal deposition layer has a compact film structure, thereby decreasing a reactive surface area. Further, it makes it difficult to supply reactants and to remove byproducts. On the other hand, if it exceeds 1,000 mTorr, it is difficult, to generate a plasma from a DC magnetron sputtering gun.

The loading amount of the metal particles can be adjusted according to a sputtering duration and an electric power. An average particle size of the metal particles is determined according to the pressure of the reaction gases and the sputtering process.

Preferably, the sputtering process is discontinuously carried out several times, instead of continuous sputtering, so as to prevent the transfer of a target temperature to a substrate.

Preferably, the thin film on which the metal nanoparticles are deposited has a thickness of about 0.01 to about 1 µm. If the thickness of the thin film is less than 0.01 µm, a uniform thin film is not easily formed. On the other hand, if it exceeds 1 µm, it is difficult to directly form an interface between the thin film and its adjoining layer, thereby decreasing reaction efficiency.

When multi-metals of two or more are used as the metal source for thin film deposition, an alloy or mosaic target with a desired composition may be used. Alternatively, several sputtering guns comprising separately two or more targets may be used.

A thin film according to the above-described method has porosity of about 20 to about 50%. The porosity can be measured according to a BET method using a nitrogen gas. If the porosity is 20% or less, desired effects cannot be obtained. On the other hand, if it exceeds is 50%, the weight of the nanoparticles per unit area decreases, thereby decreasing total system efficiency. Within the above-described porosity range, the supply of reactants and removal of byproducts are facilitated. Also, a reactive surface area increases, thereby increasing the utility of the thin film.

Therefore, a thin film according to the present invention can be generally used in structures requiring a chemical reaction. For example, a thin film according to the present invention leads to the electrochemical reaction of an electrolyte, a gaseous or liquid fuel, and oxygen in an air when applied in an electrode active material or a catalyst layer of a primary or secondary battery and a fuel cell. Further, in a structure that leads to a phase change by the absorbing and releasing of hydrogen, such as a hydrogen storage alloy, a thin film according to the present invention is used as a structure that facilitates the diffusion of a hydrogen gas. Still furthermore, in all catalytic reactions using a general chemical catalyst, a thin film according to the present invention provides a wide contact surface area of reactants with a catalyst and facilitates a transfer of reactants and byproducts, thereby increasing catalytic efficiency.

A fuel cell comprising a thin film according to the present invention will now be described in more detail.

A fuel cell according to the present invention comprises a pair of electrodes and an electrolyte film interposed between the electrodes. Each of the electrodes comprises a catalyst layer in contact with the electrolyte film and a gas diffusion layer in contact with the catalyst layer. The catalyst layer comprises metal nanoparticles and has a microporous structure with porosity of about 20% or more.

As shown in FIG. 3, a fuel cell comprises a cathode and an anode, each of which comprises an electrochemical catalyst layer and a gas diffusion layer. A hydrogen ion conducting membrane with a thickness of about 50 to about 150 µm as a solid polymer electrolyte is interposed between the two electrodes. The fuel cell is supported by a collective bipolar plate made of a conductive material. The bipolar plate provides a pathway for the active supply of a fuel (hydrogen) and an oxydizing agent (oxygen in air) and the flow of a product (water).

At the anode, a fuel is dissociated into hydrogen ions and electrons. The generated hydrogen ions travel through the electrolyte to the cathode and the generated electrons are released and flow to the cathode via the external circuit. At the cathode, the hydrogen ions react with oxygen to produce water. Electricity is generated by an electric potential difference (theoretical value: 1.2 V) between the anode and the cathode during this electrochemical reaction. The overall reaction for electricity generation can be represented as follows: (i) oxidation, (ii) ion transfer, (iii) reduction, and (iv) electricity transfer. At the anode, hydrogen or methanol reacts with water in the presence of an alloy catalyst to produce six hydrogen ions and six electrons. According to the present invention, a substrate is used in the transfer of a fuel onto the surface of a catalyst and a sputtered thin film comprising the catalyst is used in the dissociation of the fuel into ions and electrons. A substrate for a fuel cell may be a carbon paper or a carbon fiber.

Hereinafter, the present invention will be described by way of examples, but is not limited thereto.

Comparative Example 1

Figure 4:
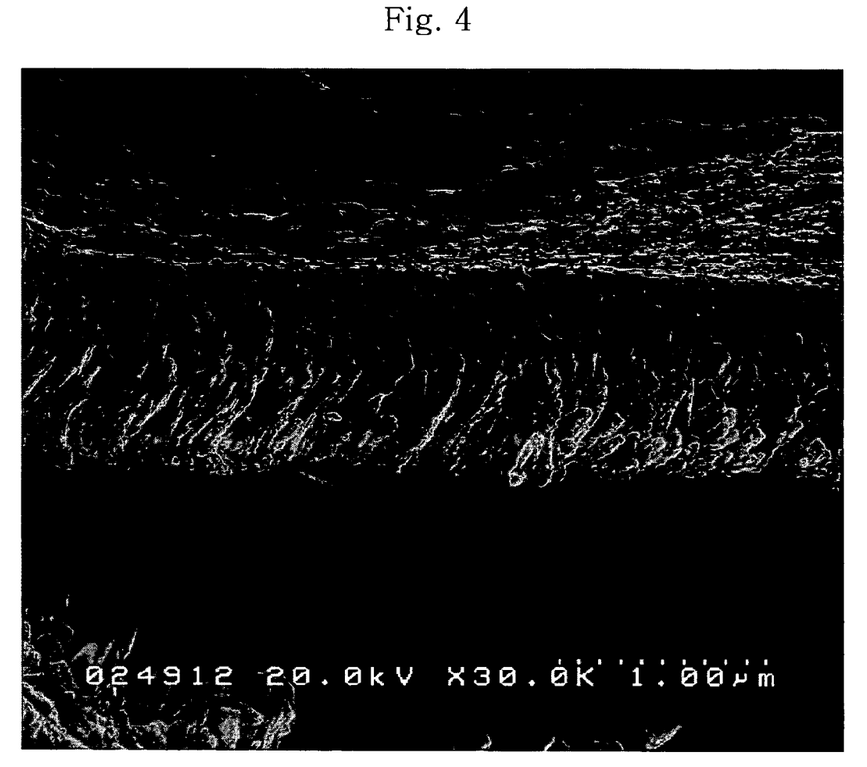
FIG. 4 is a scanning electron microphotograph (SEM) of the section of a compact thin film according to Comparative Example 1.
Figure 5:
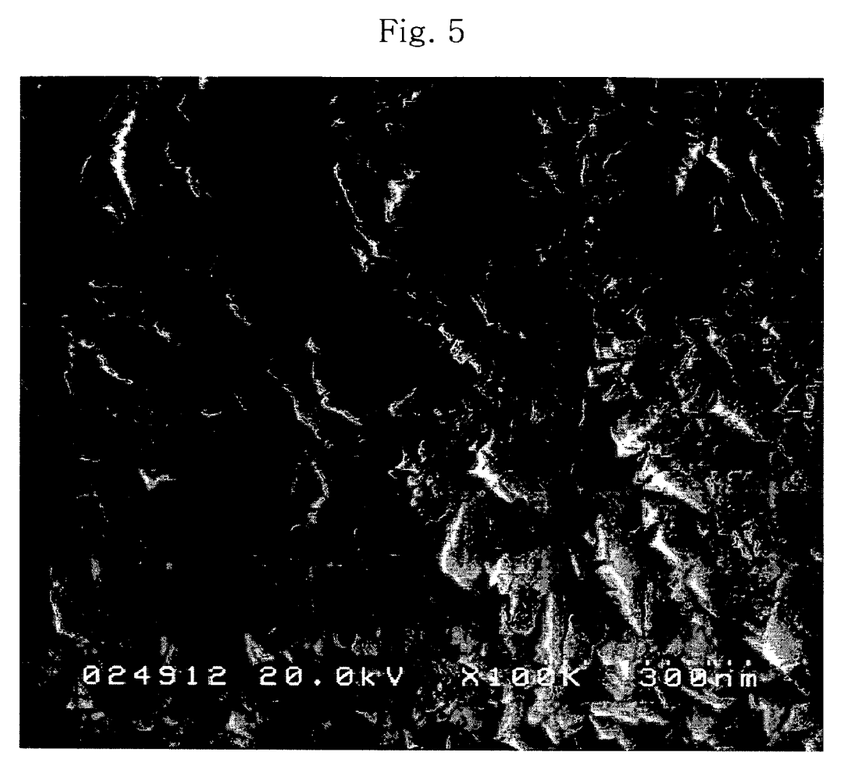
FIG. 5 is a SEM of the surface of the compact thin film according to Comparative Example 1.

In order to form a thin film structure according to a conventional method, a graphite substrate was first prepared in a vacuum atmosphere of a vacuum of $10^{-6}$ Pa. Pt particles were coated on the substrate using magnetron sputtering. The conditions for such magnetron sputtering were as follows: argon was used as the reaction gas, the reaction pressure was 20 mTorr, a sputtering gun was adjusted at a power of 300 W, and a sputtering duration was 30 minutes. The magnetron sputtering was discontinuously carried out three times (10 minutes each) in order to prevent the transfer of the temperature of targets overheated for a long time to the substrate. A microstructure of a Pt layer coated in this way was analyzed using a scanning electron microscope and the results are shown in FIGS. 4 and 5. The Pt layer was 0.8 μm thick. The porosity of the Pt layer was measured according to a BET method using nitrogen. As a result, it was demonstrated that the Pt layer was a compact metal layer with porosity of almost 0%.

Comparative Example 2

Figure 6:
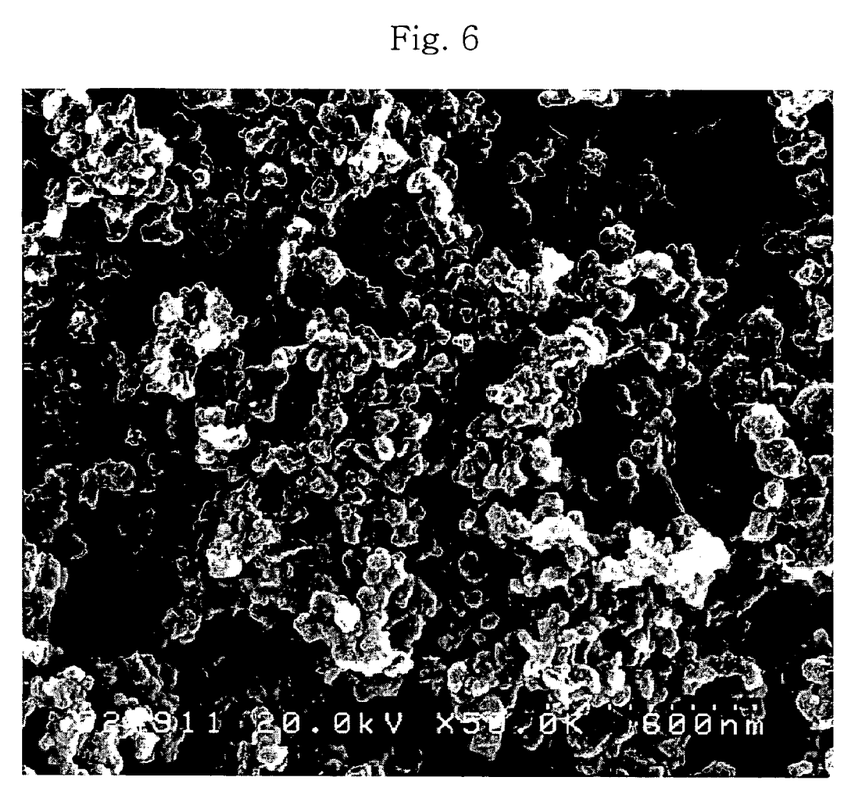
FIG. 6 is a SEM of the section of a porous thick film according to Comparative Example 2.

Porous thick films for electrodes in fuel cells were formed according to another conventional method. For this example, two pieces of carbon paper were used as substrates. Pt and Pt/Ru nanoparticles with a particle size of 5 nm were respectively dispersed in isopropyl alcohol solvents to prepare slurries. Then, the slurries were respectively coated on the two substrates in an amount of 4 mg per unit area. The coated substrates were maintained in a vacuum oven at 120° C. for 30 minutes to evaporate solvents. As a result, Pt and Pt/Ru layers were respectively formed on the two substrates and were respectively used for an anode and a cathode. The carbon paper substrates were used as electrode support layers. In this Comparative Example, carbon papers (Toray Carbon Paer, E-Teck Co.) which was water-proof treated with 20:80 polytetrafluoroethylene were used as the substrates. The microstructures of the Pt and Pt/Ru layers coated in this way were analyzed by a scanning electron microscope and the results are shown in FIG. 6. The Pt and Pt/Ru layers was 30 μm thick. The metal powders thus formed had a particle size of 5 nm. However, in an actual structure, the metal powders were observed in the form of agglomerates with a size of 60 to 100 nm. The porosity of the metal layers was measured according to a BET method using nitrogen. As a result, the porosity of the obtained metal layers was 20%.

Figure 9:
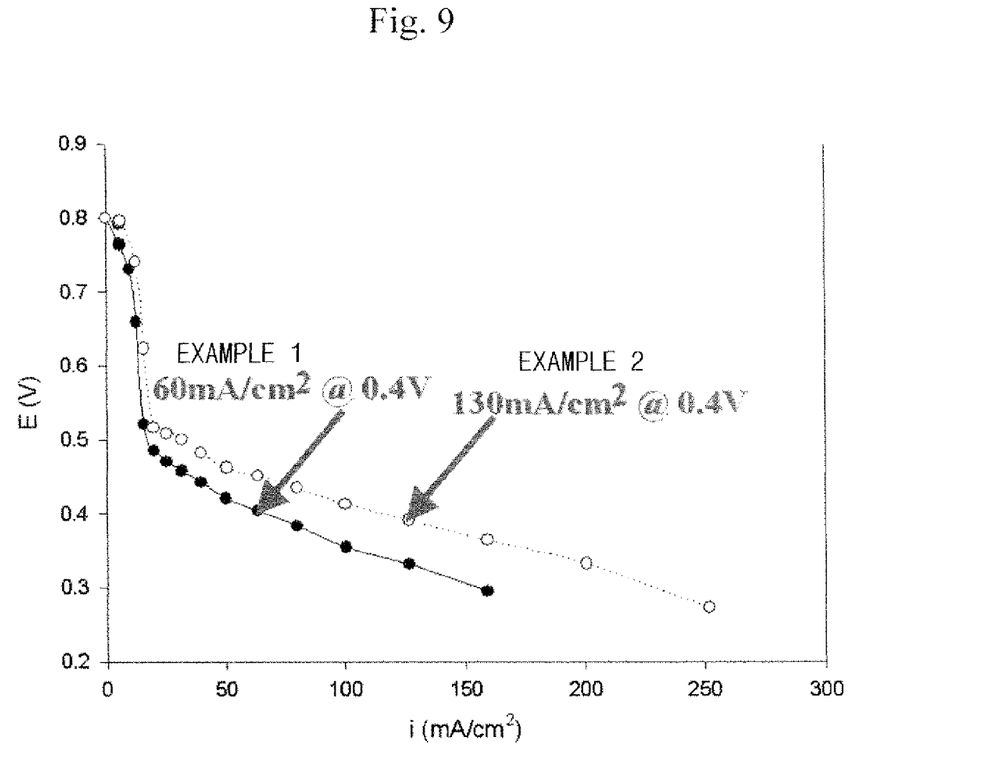
FIG. 9 is a graph showing a polarization curve of catalytic electrodes for fuel cells according to Example 1.

The two electrodes coated with the above metal catalyst layers were bonded with an ion conducting polymer membrane to prepare an electrode-membrane assembly. The bonding was carried out at 125° C., under a load of about 200 kgf/cm², and for about 3 minutes using a high pressurizer. The electrode-membrane assembly completed in this way is attached to a single cell measuring apparatus. Then, output characteristics of the electrodes for fuel cells were evaluated using a 2M aqueous solution of methanol and air. The result is shown in FIG. 9.

Example 1

In order to be used in electrodes for fuel cells, microporous thin films comprising nanoparticles according to an embodiment of the present invention were prepared. For this, a carbon paper substrate was prepared in a vacuum atmosphere of a vacuum of $10^{-6}$ Pa. Pt particles were coated on the substrate using magnetron sputtering. The conditions for such magnetron sputtering were as follows: argon was used as a first reaction gas, the reaction pressure was 300 mTorr, He and Ar (1:1) were used as a second reaction gas, a sputtering gun was adjusted at a power of 300 W, a sputtering duration was 30 minutes. The magnetron sputtering was carried out three times (10 minutes each) in order to prevent the transfer of the temperature of targets overheated for a long time to the substrate. As a result, a cathode was prepared. An anode was prepared in the same manner as in the preparation of the cathode except that Pt/Ru alloy targets were used. The microstructures of the metal films were analyzed by a scanning electron microscope. The metals were coated on the substrate in an amount of 0.2 mg per unit area. The thickness of the metal films was 0.8 μm and the metal particles of average particle size of 5 nm were uniformly dispersed. The porosity of the metal films was measured according to a BET method using nitrogen. As a result, the porosity of the metal films was 30%.

According to the same manner as described above, in Example 2, catalytic microporous thin films comprising 0.2 mg of additional nanoparticles per unit area were prepared on the electrodes obtained in Comparative Example 2.

The two electrodes coated with the above catalyst layers were bonded with an ion conducting polymer membrane to prepare an electrode-membrane assembly. The bonding was carried out at 125° C., under a load of about 200 kgf/cm², and for about 3 minutes using a high pressurizer. The electrode-membrane assembly completed in this way is attached to a single cell measuring apparatus. Then, output characteristics of the electrodes for fuel cells were evaluated using a 2M aqueous solution of methanol and air. The result is shown in FIG. 9.

As seen from the polarization curve of FIG. 9, at the same voltage, i.e., 0.4 V, the catalytic electrodes for fuel cells comprising the thin films according to Example 1 had a current density of 60 mA/cm². On the other hand, the catalytic electrodes for fuel cells comprising the thin films according to Example 2 had a current density of 130 mA/cm². From this result, it can be seen that a microporous thin film according to the present invention has an improved chemical reaction efficiency and utility.

As is apparent from the above description, a microporous thin film according to the present invention facilitates the supply of reactants and removal of byproducts through pores. Also, due to a wide reactive surface area, the utility of the thin film is increased. Therefore, the thin film according to the present invention can be widely used in structures requiring a chemical reaction, for example, electrode active materials or catalyst layers for primary and secondary batteries and fuel cells, hydrogen storage alloys, and general chemical catalysts.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A microporous thin film coated on a substrate, the microporous thin film comprising metal nanoparticles and having a microporous structure with porosity of at least about 20%, wherein the metal nanoparticles have an average particle size ranging from about 1 to about 10 nm.

2. The microporous thin film according to claim 1, wherein the porosity of the microporous thin film ranges from about 20 to about 50%.

3. The microporous thin film according to claim 1, wherein the metal nanoparticles are derived from a platinum; an alloy or mixture of platinum with one or more selected from the group consisting of gold, palladium, rhodium, iridium, ruthenium, tin, and molybdenum; or a combination or alloy of a Group 1 or 2 metal that has a hydrogen absorbing and releasing property with a Group 13 or 14 metal that facilitates the absorbing and releasing of hydrogen.

4. The microporous thin film according to claim 1, wherein the microporous thin film coated on the substrate has a thickness of about 0.01 to about 1 μm.

5. The microporous thin film according to claim 1, wherein the film is used in a lithium oxide electrode, a catalytic electrode for a fuel cell, a chemical catalyst, an adsorbent, or a hydrogen storage alloy.

6. A method of forming on a substrate a microporous thin film which comprises metal nanoparticles and has porosity of at least about 20%, the method comprising sputtering a metal source on the substrate using argon (Ar) as a first reaction gas and helium (He) or neon (Ne) as a second reaction gas under a total pressure of about 300 to about 1,000 mTorr, wherein the substrate is a carbon paper or a carbon fiber and the metal nanoparticles have an average particle size ranging from about 1 to about 10 nm.

7. The method according to claim 6, wherein the sputtering is a DC magnetron sputtering process at a power ranging from about 200 to about 500 W.

8. The method according to claim 6, wherein a mixture ratio of Ar as the first reaction gas to He or Ne as the second reaction gas ranges from about 1:0.5 to about 1:1.

9. The method according to claim 6, wherein the metal source for the metal nanoparticles is a platinum; an alloy or mixture of platinum with one or more selected from the group consisting of gold, palladium, rhodium, iridium, ruthenium, tin, and molybdenum; or a combination or alloy of a Group 1 or 2 metal that has a hydrogen absorbing and releasing property with a Group 13 or 14 metal that facilitates the absorbing and releasing of hydrogen.

10. The method according to claim 6, wherein the porosity of the microporous thin film ranges from about 20 to about 50%.

11. The method according to claim 6, wherein the microporous thin film formed on the substrate has a thickness of about 0.01 to about 1 μm.

12. A fuel cell comprising a pair of electrodes and an electrolyte film interposed between the electrodes, wherein each of the electrodes comprises a catalyst layer in contact with the electrolyte film and a gas diffusion layer in contact with the catalyst layer, wherein the gas diffusion layer and the catalyst layer are formed on a substrate, wherein the catalyst layer comprises metal nanoparticles and has a microporous structure with porosity of at least about 20%, wherein the substrate is a carbon paper and the metal nanoparticles have an average particle size ranging from about 1 to about 10 nm.

13. The fuel cell according to claim 12, wherein the porosity of the catalyst layer ranges from about 20 to about 50%.

14. The fuel cell according to claim 12, wherein the metal nanoparticles are derived from a platinum; an alloy or mixture of platinum with one or more selected from the group consisting of gold, palladium, rhodium, iridium, ruthenium, tin, and molybdenum; or a combination or alloy of a Group 1 or 2 metal that has a hydrogen absorbing and releasing property with a Group 13 or 14 metal that facilitates the absorbing and releasing of hydrogen.

15. The fuel cell according to claim 12, wherein the catalyst layer has a thickness ranging from about 0.01 to about 1 μm.

* * * * *